United States Patent [19]
Price et al.

[11] Patent Number: 5,671,372
[45] Date of Patent: Sep. 23, 1997

[54] DATA PROCESSING SYSTEM WITH MICROPROCESSOR/CACHE CHIP SET DIRECTLY COUPLED TO MEMORY BUS OF NARROWER DATA WIDTH

[75] Inventors: Warren Everett Price; Kenneth Allen Uplinger, both of Boca Raton, Fla.

[73] Assignee: International Business Machines Corporation, Armonk, N.Y.

[21] Appl. No.: 130,034

[22] Filed: Sep. 30, 1993

[51] Int. Cl.$^6$ .................................................. G06F 13/40
[52] U.S. Cl. ............................................. 395/307; 395/481
[58] Field of Search ............................... 395/458, 472, 395/421.02, 481, 306, 307, 308

[56] References Cited

U.S. PATENT DOCUMENTS

| | | | |
|---|---|---|---|
| 4,905,188 | 2/1990 | Chuang et al. | 395/425 |
| 5,067,071 | 11/1991 | Schaxim | 395/275 |
| 5,081,576 | 1/1992 | Ward | 395/325 |
| 5,155,843 | 10/1992 | Row | 395/200 |
| 5,163,131 | 11/1992 | Stamm | 395/575 |
| 5,228,134 | 7/1993 | MacWilliams et al. | 395/425 |
| 5,257,236 | 10/1993 | Sharp | 365/230.05 |
| 5,333,294 | 7/1994 | Schnell | 395/846 |
| 5,355,467 | 10/1994 | MacWilliams et al. | 395/425 |
| 5,473,770 | 12/1995 | Vrba | 395/433 |
| 5,504,875 | 4/1996 | Mills et al. | 395/497.02 |

FOREIGN PATENT DOCUMENTS 398191  5/1990  European Pat. Off. .

*Primary Examiner*—David L. Robertson
*Attorney, Agent, or Firm*—George E. Grosser

[57] ABSTRACT

A cache of a CPU/cache chip set, has a wide data path that is directly coupled, to a memory data bus having a narrow data path. The coupling is effected by a data transfer path comprising only conductors without any additional components that would introduce signal propagation delays. Cache data transfers are initiated by a cache controller. A bus controller provides data transfer control signals to transfer sets of data where each set has the same number of bits as the width of the memory bus. Data is transferred in burst cycles comprising a plurality of cache data transfer cycles. Each of the latter cycles comprises a plurality of memory bus cycles.

6 Claims, 5 Drawing Sheets

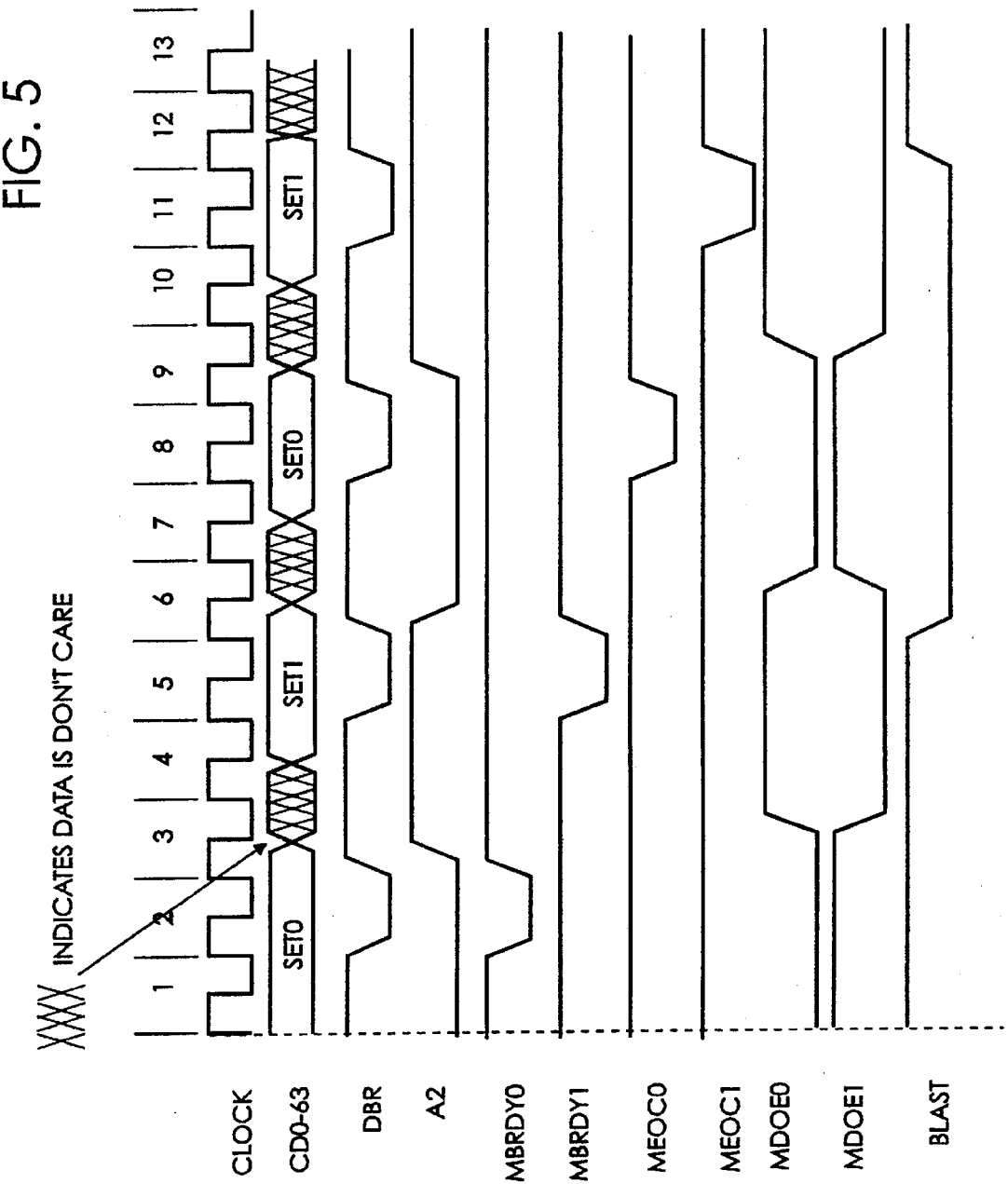

DATA PROCESSING SYSTEM WITH MICROPROCESSOR/CACHE CHIP SET DIRECTLY COUPLED TO MEMORY BUS OF NARROWER DATA WIDTH

BACKGROUND OF THE INVENTION

1. Field of the Invention

This invention relates to the field of data processing, and, more particularly, to improvements in a system having a high performance microprocessor/cache module coupled to a memory bus having a data path width less than the width of the data path to and from the module.

2. Description of Related Art

There are many different models of personal computers that use the well known 486 microprocessor marketed by Intel Corporation. The 486 microprocessor, also referred to hereinafter as the "486 CPU" (central processing unit), has a 32-bit architecture in which a memory bus has a 32-bit wide data path. Although the 486 CPU has an internal or on-chip cache, some systems further employ a level-2 or external cache to further improve performance.

A high performance 50-MHz 486 DX CPU-Cache module, which includes a 486 CPU, a level-2 or second level cache, and a cache controller, has also been commercially available from Intel Corporation. Such module and a related bus controller are described in "50-MHz INTEL486(™) DX CPU-Cache Module, Hardware Reference Manual," June 1991, Intel Corporation, to which reference may be had for a more detailed description. FIG. 1 shows a memory bus interface, as suggested by this publication, in which a CPU/Cache module 10 is coupled with a bus controller 26 and with transceivers/latches 28, to provide access through a memory bus 30 to a memory controller 33 and a memory 32. Memory controller 33 converts a system address of a memory location into column and row addresses that are strobed into the memory in conventional fashion to access the particular location being addressed. Module 10 includes a chip set 13 that comprises a 486-CPU 12 coupled to a cache controller 14 and to a cache 16, by a processor bus 18. Cache controller 14 is an 82495DX model, and cache 16 is a 82490DX model.

Controller 14 and cache 16 are coupled by a bus 20. Bus controller 26 is coupled to cache controller 14 and memory bus 30 by busses 22 and 27. Cache 16 comprises a plurality of dual ported SRAMs (static random access memories) 17. The data path of the SRAMs is thirty two bits wide thereby requiring the use of four 8-bit (one byte) SRAMs. Bus 24 transmits cache data bits CD0–31 between corresponding bit lines in the SRAMs and bus 30, so that corresponding memory data bit lines are directly coupled between the two busses 24 and 30. The memory data bits are respectively designated MD0–31. Bus 30 may be further connected to I/O devices and an expansion bus (not shown).

Bus controller 26 provides an interface between module 10 and memory bus 30 and to any other bus masters. The bus controller has four primary functions, cycle control, snooping, data control, and synchronization. Module 10 initiates a memory bus cycle by signalling controller 26. Controller 26 then requests use of memory bus and, after being granted use of the bus by arbitration, controls the data transfers by decoding all CPU-cache cycles, determining cycle length and cacheability, and gating the data onto and off of bus 24. If the data width of bus 30 is different than that of the cache or a large load is present on bus 30, optional transceivers/latches 28 (indicated by the dotted lines) need to be used.

More recently, Intel has marketed a higher performance microprocessor, known as the "Pentium" microprocessor, which is also available in a chip set 13'. The data path width from cache 16' is configurable to either 64-bits or 128-bits. While high performance systems might preferably be built with a wide (64-bits or more) data path, there is also a market requirement, for upgraded systems having a 32-bit wide data path. The upgraded systems can then use many of the system components that were previously designed for 486 CPU based systems. However, upgrade designs may encounter performance problems that might be more readily understood with reference to FIG. 2, in which parts identical to those in FIG. 1, have the same reference numbers. Prime (') suffixes are used with reference numerals, e.g. 12', to denote parts that differ but perform functions similar to the parts having the same reference numbers.

In the system shown in FIG. 2, chip set 13' includes a Pentium CPU or microprocessor 12'. Busses 18' and 24' are configured for a 64-bit wide data path for transmitting bits CD0–63. Cache 16' includes eight 8-bit wide SRAMs 17' (neglecting parity). Bus 30 is only 32-bits wide and FIG. 2 illustrates a conventional way to deal with bus reduction by use of eight transceiver/latches (TCVR/latches) 34-0 to 34-7 (of which only four are shown for simplicity of illustration) connected to respectively route data from and to each of SRAMs 17'. TCVR/latches 34-0 and 34-1 multiplex bits CD0–7 and bits CD32–39, of bus 24'. On the memory bus 30 side of latches 34, the bit lines are connected so that memory bits MD0–7 and MD32–39 are transmitted at different times on bus 30 as byte(0) thereof. The remaining latches are similarly connected.

Bus 23' is connected between bus controller 26 and cache 16' and transmits a plurality of signals including a MBRDY (memory bus ready) signal for clocking data in and out of the cache, a MDOE (memory data output enable) signal for controlling the way in which in which the module drives data onto the memory bus, and a MEOC (memory end of cycle) signal for ending the current cycle. When the MDOE signal is high, the SRAM data pins are tri-stated, and when the MDOE signal is low, the SRAMs drive the data onto bus 24.

When data is transmitted from cache 16' to memory bus 30, all 64-bits are buffered in latches 34. Under control of bus controller 26, by gate control signals on bus 29, a double transfer occurs in which bits CD0–31 are gated first onto bus 30 and bits CD32–63 are gated last. When data is transmitted in the opposite direction, i.e., from bus 30 into the cache, the first word on bus 30 is first gated into latches 34-0,2,4,6 to buffer cache bits CD0–31 and a second word is then gated into latches 34-1,3,5,7 to buffer cache bits CD32–63. When the latches become full, the entire 64-bits are transmitted to cache 16'.

FIG. 2 thus represents a prior art solution for connecting a wide cache data path to a narrower memory bus by the use of data transceivers and latches which reduce the data bus width for memory writes and increase the data bus width for memory reads. The problem with such solution is that the data transceivers and latches introduce circuit delays and slow data transmission, reduce system performance, and increase costs and circuit board space.

SUMMARY OF THE INVENTION

One of the objects of the invention is to provide an improved data processing system in which a high performance microprocessor/cache module is directly coupled to a system bus having a data bus width less than that of the data path through the module.

Another object of the invention is to provide an improved interface, between a wide cache and a narrow memory data bus, which does not include intervening circuit components such as transceiver/latches.

Briefly, in accordance with the invention, a cache module has a wide data path width that is directly coupled, to a memory data bus having a narrow data path width. The coupling is effected by a data transfer path comprising only conductors. The data transfer path does not include any additional components that would introduce signal propagation delays. A bus controller provides data transfer control signals to transfer sets of data where each set has the same number of bits as the width of the memory bus.

BRIEF DESCRIPTION OF THE DRAWINGS

Other objects and advantages of the invention will be apparent from the following description taken in connection with the accompanying drawings wherein:

FIG. 5 is a timing diagram of signals for producing a burst write transfer in the embodiment shown in FIG. 3.

DESCRIPTION OF ILLUSTRATIVE EMBODIMENT

Figure 3:
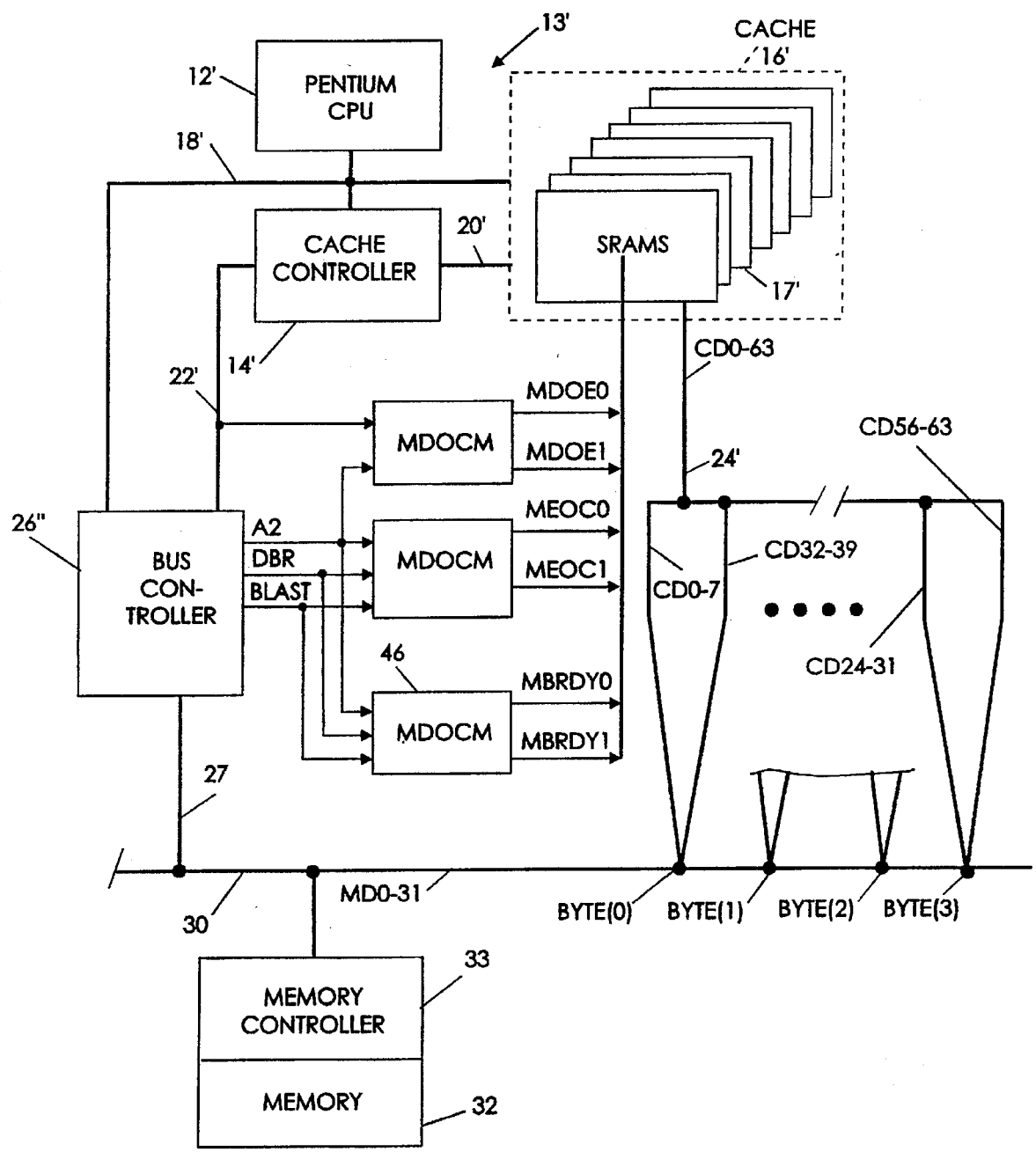
FIG. 3 is a block diagram of a comparable portion of an upgraded data processing system embodying the invention.

Referring to FIG. 3, in accordance with the invention, the solution to the problem of using the high performance chip set 13', includes configuring the cache data path width to its smallest possible size of 64-bits, and directly connecting the respective cache data lines to memory data bus 30 by a data transfer path that includes only conductor lines. The reason for configuring the cache data path width to its smallest size (64-bits) is that a larger path (128-bits) requires more support logic and would not provide any advantage in performance when a data path size reduction is required.

SRAMs 17' are directly coupled or connected to memory bus 30 by a cache data bus 24' that comprises 64-conductors or bit lines for transmitting the individual cache data bits. The cache data lines are each connected to the ends of different ones on the conductors or bits line in bus 24 to transmit cache data bits CD0-63. The bit lines in bus 24' are arranged into two groups for selectively transmitting cache bits CD0-31 as one group or set and cache bits CD32-63 as a second group of set. Furthermore, the other ends of the bit lines in each group CD0-31 and CD32-63, are connected to corresponding bit lines MD0-31 of memory bus 30 in a fan-in/fan-out fashion. That is, each memory bus bit line is connected to a corresponding bit line in each of the two groups. For example, bit line MD0 of memory bus 30 is connected to bit lines CD0 and CD32. In a more generic sense, the data width of cache 16' has "m" bits, the data width of memory bus has "n" bits, where the ratio of "m" to "n" is an integer "r". Data is transferred in "r" sets for each cache data transfer between cache and memory. Thus, the data transfer path (i.e., busses 24' and 30) between cache 16' and memory controller 33 does not include any circuits, such as transceiver/latches, which would otherwise introduce propagation delays.

Figure 1:
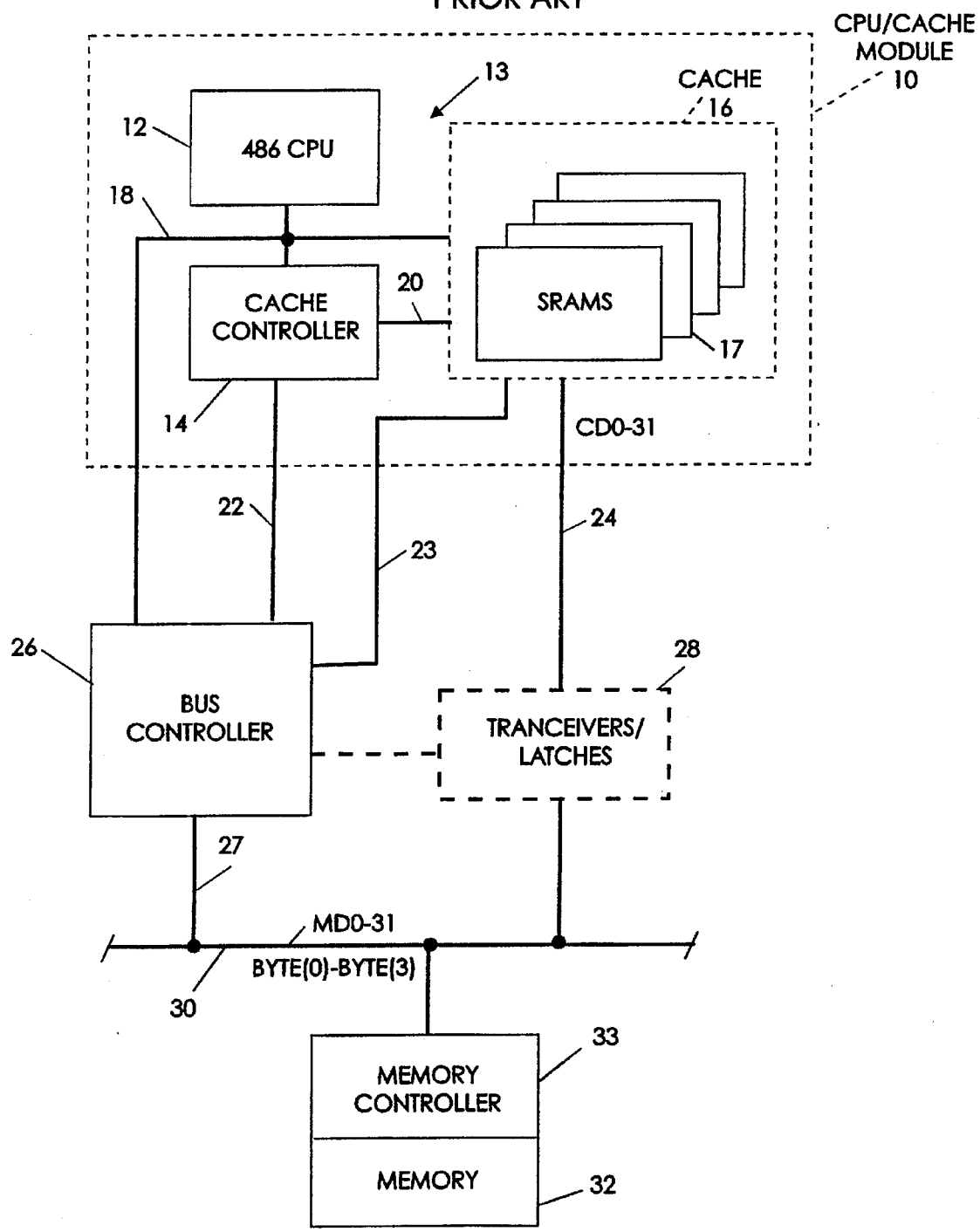
FIG. 1 is a block diagram of a portion of a prior art data processing system.
Figure 2:
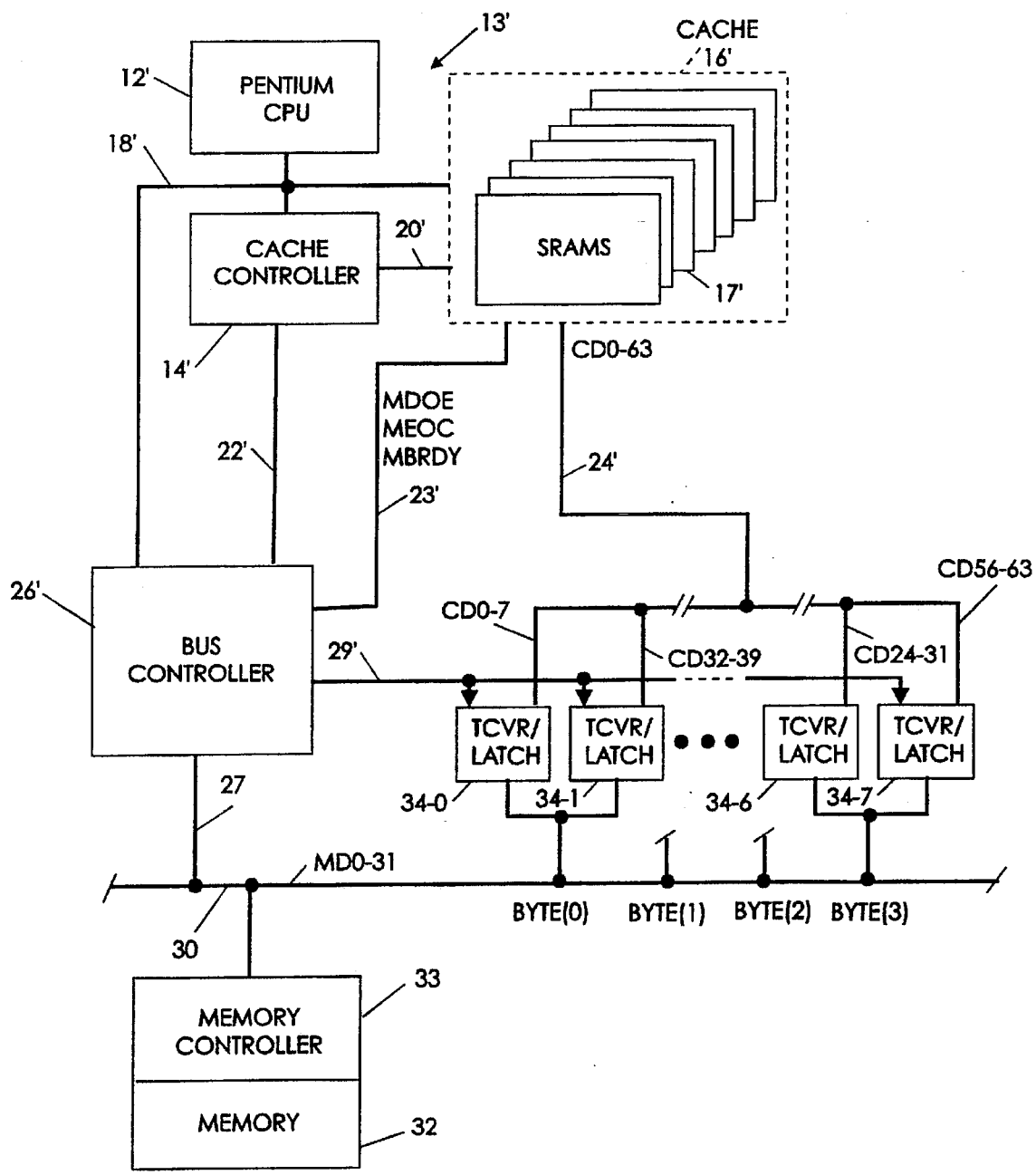
FIG. 2 is a block diagram of a similar portion of an upgraded, prior art data processing system.

Three support modules 42, 44, and 46 are connected between bus controller 26' and cache 16' for the purpose of controlling data transfers without using any TCVRs/latches 34 (FIG. 2). Module 42 is a memory data output-enable control module (MDOCM), module 44 is a memory end of cycle module (MEOCM), and module 46 is a memory data ready module (MDRM). These modules receive input signals from bus controller 26' and drive output signals onto bus 23" for transmission to cache 16', as described in more detail below relative to FIGS. 4 and 5.

The main function of bus controller 26' is to interpret cycle length information, to decide how many cache memory transfers are required, and to run the correct number of memory bus cycles for each data transfer cycle thereby causing cache data to be read or written over cache data bus 24'. Cycle length information is provided to controller 26' by CPU/cache module initiated cycle definition signals RDYSRC, WR, MCACHE, and BE(0:7), and system installed MKEN, whose descriptions and cycle length meanings are standard in accordance with the Intel architecture. Briefly, such signals are:

RDYSRC—This signal is an output signal from cache controller 14' and informs bus controller 26' that it may (RDYSRC=high) or may not (RDYSRC=low) drive the CPU's ready signal. The signal is also used to identify cycle types, and hence cycle length, depending on whether the bus controller is asked to source the CPU's ready signal.

WR—This signal is a write/read signal driven by cache controller 14' and informs the computer system whether the current cycle is a write (WR=high) or a read (WR=low) operation.

MCACHE—This signal is an output signal from cache controller 14' which informs bus controller 26' that, on read cycles, the current cycle is potentially cacheable (MCACHE=low). If MCACHE is high, the current read cycle may not be cached. On write cycles, MCACHE low indicates a cache write-back cycle.

MKEN—This signal is an input to cache controller 14' and is low when the current memory cycle is determined by the computer system to be in a cacheable address space.

BE(0:7)—These are byte enable signals which inform bus controller 14' how many bytes are involved in a current read or write transfer. The byte enable signals are generated by cache SRAMs 17'.

With the cycle length known, controller 26' initiates memory bus cycles to memory 32 and keeps count of the data transferred on bus 24'. Data on bus 24' is considered valid during read cycles and transferred during write cycles when a data bus ready (DBR) signal is asserted active low by bus controller 26'. Since controller 26' knows the required number of memory data transfers and also counts the data transfers and memory bus cycles in progress, a signal called BLAST is generated by controller 26' for indicating that the last data set transfer is in progress. The BLAST signal is active low and used an input by the MDRM and the MEOCM, and controls the duration of burst transfers.

As described above, cache data bus 24' is reduced in half, from 64-bits to 32-bits, and it is necessary for controller 26' to run a double transfer of two sets of 32-bit memory bus transfers, for each 64-bit cache data transfer requested by the CPU/cache module. Bits CD0-31 form set(0) and bits CD32-63 form set (1). Since two memory bus cycles are generally required for each data transfer cycle, it is necessary for controller 26' to generate address signal A2 during these double transfers to indicate which data set is being transferred during each memory bus cycle. Address signal A2 must be inverted during the second half of all double transfers. Address signal A2 is then transmitted from controller 26' and is used by MDRM 46 and MDOCM 42 to determine which cache data set is involved in the current memory data transfer. Address signal A2 is generated, for the first memory bus cycle of a cache data transfer, from the BE(0:7) signals in accordance with the following logic as expressed by boolean equations:

!A2=!BE0
 # !BE1
 # !BE2
 # !BE3
 # !MCACHE & !RDYSRC
 # !MCACHE & !MKEN;

where "!" means a logical NOT function, "&" means a logical AND function, and # means a logical OR function.

MDRM 46 has three inputs for the A2, DBR, and BLAST signals, and generates two output signals MBRDY0 and MBRDY1 in accordance with the following logic:

!MBRDY0=!DBR & !A2 & BLAST;
!MBRDY1=!DBR & A2 & BLAST;

MDRM 46 supports logic functions as follows. Each cache data set is assigned a different MBRDY signal that is used to strobe data into or out of that particular set. For example, during a read cycle, data is presented to both sets with signal MBRDY0 or MBRDY1 selecting the proper set. Input signal A2 is used to select the proper set for the current transfer while DBR is asserted by bus controller 26', to inform MDRM 46 that the data is valid on cache bus 24'. The BLAST signal indicates that the current transfer is not the last cache data transfer and that other transfers will occur.

MEOCM 44 has three inputs for the DBR, A2, and BLAST signals and generates two MEOC signals, MEOC0 and MEOC1, according to the following logic:

!MEOC0=!DBR & !A2 & !BLAST;
!MEOC1=!DBR & A2 & !BLAST;

The MEOC signals are transmitted to cache SRAMs 17' and provide two functions. One function is to serve as an MBRDY signal for the last piece of data transferred to each cache set on a read cycle. The other function is to end a cache bus cycle by informing both sets that a read or write cycle has completed. To activate an MEOC signal, MEOCM 44 also receives address A2 and DBR signals from controller 26'.

MDOCM 42 has two inputs for receiving signals WR and A2, and produces two output signals MDOE0 and MDOE1 for driving the cache outputs, in accordance with the following logic:

!MDOE0=WR & !A2;
!MDOE1=WR & A2;

MDOCM 42 controls data steering during write operations. To control such steering, each cache data set is identified by a separate data output enable MDOE signal, MDOE0 or MDOE1. Address signal A2 determines which set is to be enabled.

Figure 4:
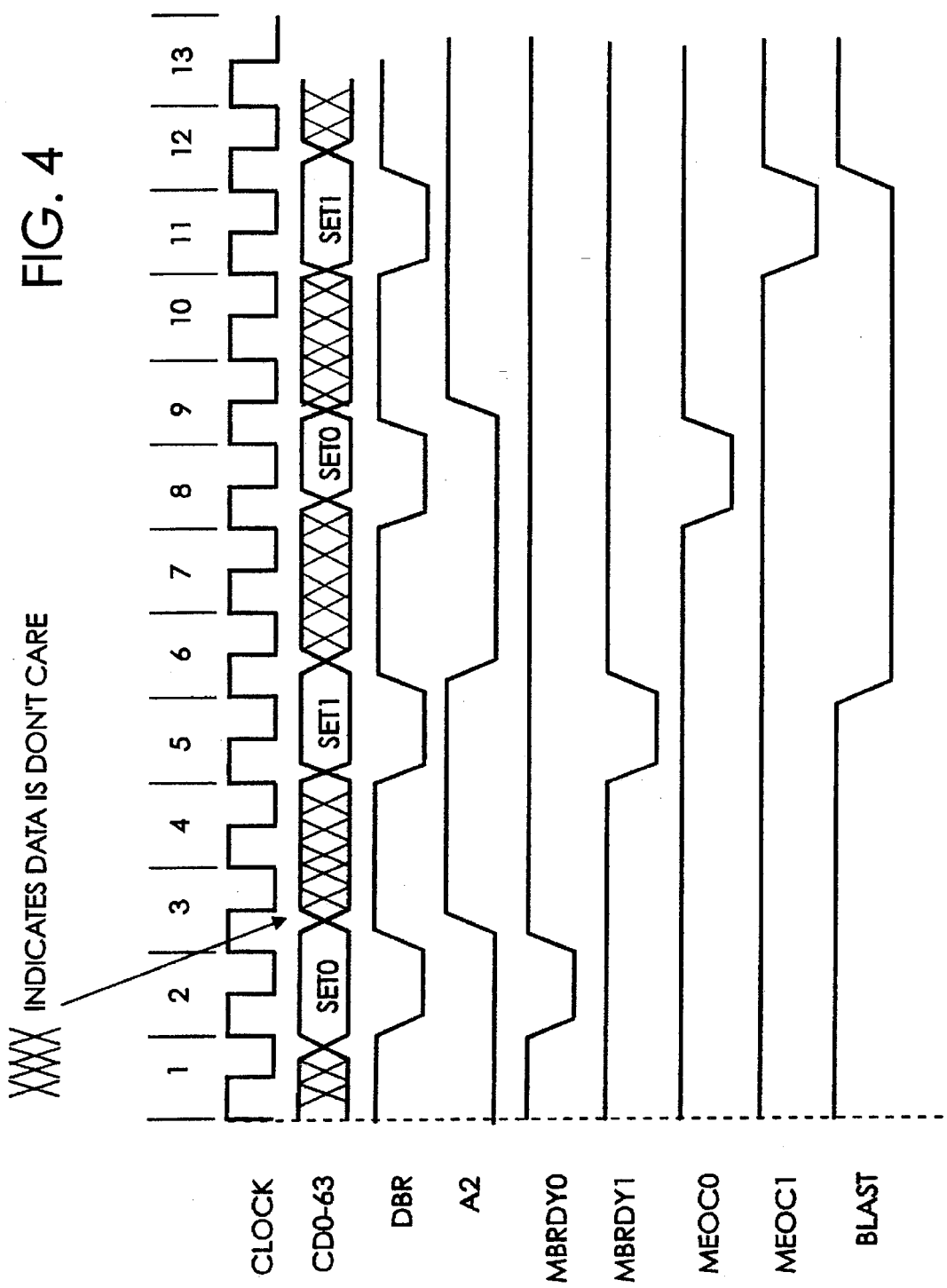
FIG. 4 is a timing diagram of signals for producing a burst read transfer in the embodiment shown in FIG. 3.

It should be appreciated that many different functions occur during the operation of a data processing system and that only those signals necessary for an understanding of the invention, are shown in FIGS. 3–5 to illustrate burst read and write data transfers between cache 16' and memory 32. As indicated above, cache controller 14' recognizes the need for and initiates a cache data transfer. The need might arise, e.g., when a CPU read request results in a cache miss. The cache controller then signals bus controller 26' which, in turn, requests use of memory bus 30. When controller 26' is granted use of the bus, controller 26' initiates one or more cache data transfer cycles in which 64-bits of data are transferred in each cycle. Usually, an entire cache line of data is transferred each time to either read in a new cache line during a read operation or to write out a cache line of data to memory. A cache line for the particular cache 16' has a length of 32-bytes and requires four cache data transfers. When the need arises for a cache data transfer, cache controller 14' initiates the transfer by sending the cycle length attribute signals RDYSRC, WR, MCACHE, and BE(0:7) to bus controller 26'. The bus controller takes these cycle length attribute signals, as well as the system generated MKEN signal, and determines how many memory bus cycles must be performed on bus 30 to transfer the correct amount of data.

FIG. 4 shows timing relationships for an exemplary burst read data transfer between memory 32 and cache 16'. A burst transfer involves a plurality of cache data transfer cycles, and each cache data transfer cycle includes two memory bus cycles. Each memory bus cycle requires three clock periods. For simplicity, each burst cycle is illustrated as requiring only two cache data transfers. During a burst read cycle, bus controller 26' drives or asserts DBR signal low as sets of memory data MD0–31 are placed on busses 24' and 30 by memory controller 33. MDRM 46 observes the DBR signal and generates output signals MBRDY0 and MBRDY1 according to address signal A2. SRAMs 17' receive the data on the rising edge of CLOCK with MBRDYx asserted low. While data is being received, bus controller 26' counts the number of CPU/cache module transfers (as indicated by DBR being active) and asserts the BLAST signal low as the last 64-bits of data are sent to cache 16'. With BLAST low, the last 64-bits of data are received by SRAMs 17' with the rising edge of CLOCK and MEOC0 or MEOC1 low.

During the first cache data transfer cycle, data SET0 is placed on the memory bus 30 by memory controller 33 and bus controller 26' drives the DBR signal low. The low A2 notifies the cache 16' that SET0 data is being transferred allowing the cache to expect such data input from bus 24' and lines CD0–31. The MBRDY0 strobe signal is asserted low allowing the data from lines CD0–31 to be read into the cache. Signal A2 is driven high in clock 3 indicating SET1 is about to be transferred. When SET1 data is placed on the memory bus, DBR is again driven low and MBRDY1 is driven low allowing the cache to read SET1 data from bit lines CD31–63 into the cache. The second cache data transfer cycle, is also the last in the example, and is signified by bus controller 26' driving BLAST low. The memory controller 33 places SET0 and SET1 on bus 30 during successive memory bus cycles, and the signals MEOC0 and MEOC1 are driven low to signify the last cache transfer cycle and to strobe the data into the cache.

It should be noted that relative to the system shown in FIG. 2, the signal propagation time is minimized in the data transfer path between memory controller 33 and the module pins P connected to bus 24', due to the fact that the data transfer path contains only conductors. Hence, FIG. 4 shows data bits MD0–63 being valid on bus 24' and supplied to SRAMs 17' every three clocks with DBR low. If the TCVR/ latches 34 of FIG. 2 had not been removed, the resulting signal propagation time delay may have caused an extra CLOCK signal to be inserted between all DBR active low times and would have resulted in an overall increase in transfer time.

With reference to FIG. 5, a burst write cycle begins with cache controller 14' initiating a write cycle and sending the cycle length information to bus controller 26'. Bus controller 26' starts the burst write data transfer via memory controller 33. The illustrated burst cycle comprises two successive cache data transfer cycles each comprising two memory bus cycles, similar to the burst read cycle above, during which SET0 and SET1 data are transferred on successive memory bus cycles. SET0 data bits CD0–31 are output from SRAMs 17' and driven onto bit lines CD0–31 of bus 24' and thence onto the data lines of memory bus 30. In clock frames 1–3, the MDOE0 signal is active since address A2 is low and the cycle is a write cycle. With MDOE0 active, SET0 data is placed on bus 24' by SRAMs 17' and received by memory controller 33 as DBR becomes active. As the burst cycle continues, MDOE1 is alternately set active in clock frames 4–6 and frames 10–12 allowing SET1 data to be written to memory 32.

It should be apparent to those skilled in the art that many changes can be made in the details and arrangements of steps and parts without departing from the scope of the invention as defined in the appended claims.

What is claimed is:

1. Data processing apparatus comprising:

a memory subsystem comprising an addressable, a memory bus having a plurality of "n" data bit lines, and a memory controller connected between said RAM and said memory bus for controlling access thereto, said memory controller transferring "n" data bits in each memory bus cycle;

a CPU/cache chip set including a cache memory having a data path width of "m" bits, where "m" is greater than "n" and having a the ratio of "m" to "n" that is an integer "r", said cache memory having "m" cache data lines through which data bit signals are transmitted into and out of said cache memory;

a data transfer path extending between said cache memory and said memory bus, said path consisting of "m" conductors corresponding to respective bits of an "m" in bit word, each conductor having a first end and a second end, each conductor having its first end directly connected to a different one of said cache data lines, said conductors being arranged into "r" groups of "n" conductors with each conductor in each group corresponding to a respective "n" bit subset of the "m" bits and having its second end connected to a different data bit line of said memory bus so that each data bit line of said memory bus is directly connected to "r" data transfer path conductors; and control means connected between said CPU/cache chip set and said memory bus for controlling direct cache data transfers between said RAM and said cache memory, said control means being operative, for each such cache data transfer, to transfer, sequentially, "r" data sets with "n" data bits in each data set said control means producing signals coordinating direct transfers of "n" bit subsets at said cache with respective "n" bit memory bus cycle transfers, said data sets being transferred over said memory bus one data set per memory bus cycle.

2. Data processing apparatus in accordance with claim 1 wherein said control means comprises:

a bus controller connected to said cache memory for initiating "r" memory bus cycles for each cache data transfer; and logic means connected to said bus controller and to said cache memory for controlling direct sequential gating of "r" data sets of "n" bits to respective portions of "m" bit of cache memory during each cache data transfer.

3. Data processing apparatus in accordance with claim 2 wherein:

said bus controller generates a first signal identifying which data group is being transferred in each memory bus cycle, a second signal defining when data is valid on said data transfer path, and a third signal identifying completion of cache data transfers; and said logic means generates a plurality of signals in response to said first, second, and third signals from said bus controller, said plurality of signals including "r" strobing signals for strobing said data sets, "r" steering signals for steering data sets into respective subsets of the "m" bits of said cache memory during write cache data transfers, and completion signals notifying said cache memory of completion of data transfer.

4. Data processing apparatus comprising:

a microprocessor;

a dual ported cache having one port connected to said microprocessor for transferring data therebetween, said cache having a second port provided with "m" cache data lines through which cache data bits are transmitted into and out of said cache in response to strobe signals;

a cache controller connected to said microprocessor and to said cache;

a memory for storing data which is read from and written to the memory bus in response to strobe signals;

a memory bus comprising "n" bit lines where "n" is less than "m" having a ratio of "m" to "n" that is an integer "r";

a memory controller connected between said memory and said memory bus for controlling access to said memory, said memory controller producing memory bus cycles and transmitting "n" data bits in each memory bus cycle;

a cache data bus connected between said second port of said cache and said memory bus for transferring data between said memory and said cache, said cache data bus having "m" conductors, each conductor having a first end and a second end, each conductor having its first end connected to a different one of said cache data lines, said conductors being arranged into "r" groups of "n" conductors with each conductor in each group having its second end connected to a different data bit line of said memory bus so that each data bit line of said memory bus is directly connected to "r" conductors;

control means connected to said cache controller, to said memory bus, and to said cache for coordinating strobe signals transfer of cache data between said memory and said cache, said control means being operative, to produce control signals for each data transfer, to sequentially transfer "r" data sets with "n" data bits in each data set directly to a respective group of cache data lines so that, said data sets are transferred over said memory bus to said cache one data set per memory bus cycle.

5. Data processing apparatus in accordance with claim 4 wherein said control means comprises:

a bus controller connected to said cache controller for producing "r" memory bus cycles for each cache data transfer; and logic means connected to said bus controller and to said cache for controlling sequential gating of "r" data sets directly into and out of respective portions of "m" bits of said cache during each cache data transfer.

6. Data processing apparatus in accordance with claim 5 wherein:

said bus controller generates a first signal identifying which data group is being transferred in each memory bus cycle, a second signal defining when data is valid on said data transfer path, and a third signal identifying completion of cache data transfers; and said logic means generates a plurality of signals in response to said first, second, and third signals from said bus controller, said plurality of signals including "r" strobing signals for indicating "n" bit data sets are ready to be transferred, "r" steering signals for steering respective data sets into corresponding portions of said cache during write cache data transfers, and completion signals notifying said cache of completion of data transfer.

* * * * *